United States Patent [19]

Seita et al.

[11] Patent Number: 4,743,375
[45] Date of Patent: May 10, 1988

[54] FLAT PERMEABLE MEMBRANE

[75] Inventors: Yukio Seita, Fuji; Makoto Emi, Fujinomiya, both of Japan

[73] Assignee: Terumo Corporation, Tokyo, Japan

[21] Appl. No.: 796,433

[22] Filed: Nov. 8, 1985

[30] Foreign Application Priority Data

Nov. 9, 1984 [JP] Japan ............................ 59-236180
Aug. 29, 1958 [JP] Japan ............................ 60-188480

[51] Int. Cl.⁴ .......................................... B01D 13/00
[52] U.S. Cl. ............................ 210/500.36; 210/654; 428/516; 428/523; 264/41
[58] Field of Search ............ 428/220, 516, 523; 264/41; 210/645, 654, 500.36

[56] References Cited

U.S. PATENT DOCUMENTS

| | | |
|---|---|---|
| 3,351,495 | 11/1967 | Larsen et al. |
| 3,401,798 | 9/1968 | Nyrop . |
| 3,729,332 | 4/1973 | Grubb et al. . |
| 3,830,733 | 3/1972 | Spivack et al. . |
| 3,937,758 | 2/1976 | Castagana ............ 525/245 |
| 4,134,837 | 1/1979 | Yamashita et al. . |
| 4,197,148 | 4/1980 | Shinomura . |
| 4,206,050 | 6/1980 | Walch et al. . |
| 4,253,900 | 3/1981 | Dege et al. ........... 210/500.36 X |
| 4,401,567 | 9/1983 | Shindo et al. . |
| 4,438,850 | 3/1984 | Kahn .................... 206/634 |
| 4,539,256 | 9/1985 | Shipman . |
| 4,613,441 | 8/1986 | Kohno et al. . |

FOREIGN PATENT DOCUMENTS

| | | |
|---|---|---|
| 0105629 | 4/1984 | European Pat. Off. . |
| 0108601 | 5/1984 | European Pat. Off. . |
| 1546657 | 7/1970 | Fed. Rep. of Germany . |
| 2625681 | 3/1977 | Fed. Rep. of Germany . |
| 2751075 | 6/1978 | Fed. Rep. of Germany . |
| 2722025 | 11/1978 | Fed. Rep. of Germany . |
| 3118924 | 4/1982 | Fed. Rep. of Germany . |
| 7617618 | 1/1977 | France . |
| 0142860 | 7/1985 | Japan . |
| 1051320 | 12/1966 | United Kingdom . |
| 1078895 | 8/1967 | United Kingdom . |
| 2115425 | 9/1983 | United Kingdom . |

Primary Examiner—P. C. Ives
Attorney, Agent, or Firm—Cushman, Darby & Cushman

[57] ABSTRACT

A flat permeable polyolefin membrane 10 to 500 μm in thickness, which has in one surface thereof a compact layer formed of intimately bound fine polyolefin particles and possessed of fine pores and in the interior and the other surface thereof a layer formed of an aggregate of fine discrete polyolefin particles of an average diameter in the range of 0.01 to 5 μm so adjoined as to form fine labyrinthically continuing through pores and which, therefore, establishes communication between the opposite surfaces of said membrane.

15 Claims, 8 Drawing Sheets

FLAT PERMEABLE MEMBRANE

BACKGROUND OF THE INVENTION

1. Field of the Invention

This invention relates to a permeable membrane and a method for the manufacture thereof. Particularly, this invention relates to a permeable membrane useful as for filtration of blood plasma and a method for the manufacture of the permeable membrane. To be more particular, this invention relates to a permeable membrane possessed of pores of a controlled diameter and enabled to provide efficient removal of pathogenic macromolecules, ensure recovery of albumin in a high ratio and permit efficient treatment of a large amount of blood plasma and to a method for the manufacture of the permeable membrane.

2. Description of Prior Art

Heretofore, various permeable membranes have been used for the separation of whole blood into blood corpuscles and blood plasma. For example, the permeable membrane for the separation of blood plasma is used for the preparation of a blood plasma medicament for transfusion, for the pretreatment of an artificial kidney, and for the therapy resorting to change of blood plasma. The therapy by the change of blood plasma has been demonstrated to be effective against such auto-immunizing diseases as hepatic insufficiency, serious myasthenia, and chronic arthrorheumatism. This therapy if effectively carried out by separating the whole blood from the patient into blood corpuscles and blood plasma, then discarding the blood plasma containing a pathogenic substance, and adding to the blood corpuscles the blood plasma taken from a healthy man or a blood plasma medicament. The use of the blood plasma medicament entails such problems as the difficulty in the procurement of the medicament itself and the possibility of evil effect of infections factor. Thus, the method which comprises clarifying the blood plasma separated from the patient's own whole blood and recombining the clarified blood plasma with the blood corpuscles also separated from the whole blood proves desirable. The desirability of developing a membrane effective for the purpose of this separation is urged.

As membranes useful for such separation of blood plasma as described above, regenerated cellulose membrane, cellulose acetate membrane, polyvinyl alcohol membrane, polysulfone membrane, polymethyl methacrylate membrane, etc. have been known to the art. These high molecular membranes are deficient in mechanical strength, pore diameter of membrane, capacity for treatment of blood plasma, etc. Most of them are impervious to albumin which is beneficial to the hyman system, pervious not only to albumin but also to pathogenic macromolecules, or susceptible of early clogging and, therefore, incapable of removing pathogenic macromolecules in a sufficient amount. The term "pathogenic macromolecule" as used herein means immune globulin M (IgM, Mw about 950,000), low density ripoprotein (LDL, Mw about 1,200,000 to 3,300,000), immune complexes, rheumatic factor, etc. which have larger molecular weights than albumin. For the purpose of removing pathogenic macromolecules aimed at and returning albumin as a beneficial blood plasma component to the patient's system, it is necessary to use a separation membrane which possesses desired pore diameter and porosity and a membranous texture difficult to clog, and permits clarification of a large amount of blood plasma.

As a separation membrane for the removal of blood plasma components of medium to high molecular weights, there has been proposed a porous polyethylene hollow-fiber membrane which is made of high-density polyethylene having a density of at least 0.955 g/cm$^3$, possessed of a multiplicity of fine pores penetrating the wall thereof from the inner wall surface through the outer wall surface of the hollow fiber, oriented in the direction of length of the hollow fiber, and possessed of a porosity in the range of 30 to 90% by volume (Japanese Patent Laid-open No. SHO 58(1983)-75,555). In the hollow fiber membrane described above, since the fine pores are mechanically formed by cold drawing a high-orientation blood plasma type unstretched hollow fiber and subsequently hot drawing the cold drawn hollow fiber and, moreover, the fine pores so formed are substantially straight and substantially uniform in diameter from the inner wall surface through the outer wall surface, the pore density per unit volume cannot be increased and the capacity for blood plasma treatment per unit surface area is small and the ratio of recovery of albumin is low. Further, the membrane is readily fractured by orientation and is heavily deformed and shrunken by the intense heat as generated during the sterilization with an autoclave, for example.

A hollow fiber made of a vinyl alcohol type polymer and possessed of a compacted layer on at least one of the opposite surfaces of the hollow fiber membrane and a porous layer in the interior of the web of the hollow fiber membrane has been proposed (U.S. Pat. No. 4,402,940). Since the hollow fiber membrane of this type is obtained by spinning the solution of the vinyl alcohol type polymer, however, it suffers from the disadvantage that the pore density per unit volume cannot be increased, the capacity for blood plasma treatment per unit volume is small, the pathogenic macromolecules cannot be sufficiently removed, and the ratio of recovery of albumin, etc. is low.

There has been proposed a permeable membrane which is produced by preparing a mixture of a polymer such as crystalline polyolefin or polyamide which is sparingly soluble in a solvent and is stretchable with a compound which is partially compatible with the polymer and is readily soluble in a solvent, molding the mixture in the form of film, sheet, or hollow member, treating the molded mixture with a solvent, drying the wet molded mixture, and stretching the dried molded mixture monoaxially or biaxially at an elongation of 50 to 1,500% (U.S. Pat. No. 4,100,238). Since this membrane is stretched exclusively for the purpose of enlarging the pores in diameter, it exhibits low mechanical strength and poor durability. Further since the pores are substantially uniform in structure in the opposite surfaces and in the interior and the polymer crystals are coarse, it separates the components of medium to high molecular weights with difficulty despite its low strength.

It is, therefore, an object of this invention to provide a novel permeable membrane and a method for the manufacture of this permeable membrane.

Another object of this invention is to provide a permeable membrane useful as for filtration of crystals and a method for the manufacture of the permeable membrane.

Still another object of this invention is to provide a permeable membrane possessed of pores of a controlled diameter and enabled to recover albumin in a high ratio, remove pathogenic macromolecules with high efficiency, and treat a large amount of blood plasma and a method for the manufacture of the permeable membrane.

Yet another object of this invention is to provide a porous membrane useful for separating blood components having good heat stability without any change in membrane structure and permeability by thermal history and a method for the manufacture thereof.

Still yet another object of this invention is to provide a porous membrane capable of giving sufficient permeability without further stretching and a method for the manufacture thereof.

SUMMARY OF THE INVENTION

The objects described above are attained by a flat permeable membrane polyolefin 10 to 500 μm in thickness, which has in one surface thereof a compact layer formed of intimately bound fine polyolefin particles possessed of fine pores and in the interior and the other surface thereof a layer formed of an aggregate of fine discrete polyolefin particles of an average diameter in the range of 0.01 to 5 μm so adjoined as to form the fine labyrinthically continuing through pores and which, therefore, establishes communication between the opposite surfaces of the membrane.

This invention also relates to a flat permeable membrane wherein the compact layer accounts for not more than 30% of the total thickness of the membrane. This invention relates also to a flat permeable membrane wherein the polyolefin membrane has a porosity in the range of 10 to 85% preferably 10 to 60%. This invention relates to a flat permeable porous membrane wherein the fine pores in the compact layer have an average diameter in the range of 0.01 to 5 μm. Further this invention relates to a flat permeable membrane wherein the fine discrete particles forming the layers of an aggregate of particles have an average diameter in the range of 0.02 to 1.0 μm. This invention further relates to a flat permeable membrane which is made of a polyolefin selected from the group consisting of polyethylene, polypropylene, and ethylene-propylene copolymer. This invention relates further to a flat permeable membrane which has a porosity in the range of 10 to 85% and a shrinkage of not more than 6.0% in a heat treatment performed at 121° C. for 120 minutes. This invention relates to a permeable membrane which is a porous membrane for the separation of blood components. The thickness of the membrane preferably is in the range of 20 to 300 μm. The porosity preferably is in the range of 30 to 80%. The average diameter of said fine pores preferably is in the range of 0.02 to 2.0 μm. The thermal shrinkage preferably is not more than 3.0%.

The aforementioned objects are further attained by a method for the manufacture of a flat permeable membrane, which is characterized by the steps of mixing a polyolefin, an organic filler uniformly dispersible in the polyolefin in the molten state thereof, and a crystal seed forming agent, discharging the resultant mixture in the molten state thereof through a die, bringing one surface of the discharged molten membrane into contact with a cooling roll thereby cooling and solidifying the membrane, and placing the cooled and solidified flat membrane in contact with an extractant incapable of dissolving the polyolefin thereby extracting and removing the organic filler from the web of the membrane.

The invention relates to a method for the manufacture of a flat permeable membrane, wherein the organic filler is a hydrocarbon having a boiling point exceeding the melting point of the polyolefin. Further, this invention relates to a method for the manufacture of a flat permeable membrane, wherein the hydrocarbon is liquid paraffin or an α-olefin oligomer. This invention relates to a method for the manufacture of a flat permeable membrane, wherein the organic filler is incorporated in an amount in the range of 35 to 600 parts by weight, based on 100 parts by weight of the polyolefin. This invention also relates to a method for the manufacture of a flat permeable membrane, wherein the polyolefin is at least one member selected from the group consisting of polyethylene, polypropylene, and ethylene-propylene copolymer. This invention relates also to a method for the manufacture of a flat permeable membrane, wherein the crystal seed forming agent is an organic heat-resisting substance having a melting point of not less than 150° C. and a gel point exceeding the temperature at which the polyolefin begins to crystallize. This invention relates to a method for the manufacture of a flat permeable membrane, wherein the crystal seed forming agent is incorporated in an amount in the range of 0.1 to 5 parts by weight, based on 100 parts by weight of the polyolefin. Further, this invention relates to a method for the manufacture of a flat permeable membrane, wherein the extractant is at least one member selected from the group consisting of alcohols and halogenated hydrocarbons. This invention relates to a method for the manufacture of a flat permeable membrane, wherein the temperature of the cooling roll is in the range of 10° to 100° C. This invention relates also to a method for the manufacture of a flat permeable membrane, which further comprises the steps of cooling and solidifying the membrane, maintaining said flat membrane in a certain or desired area, and subjecting the formed polyolefin membrane, to a treatment at a temperature 20° to 50° C. lower than the melting point of the polyolefin.

DESCRIPTION OF PREFERRED EMBODIMENT

Figure 1:
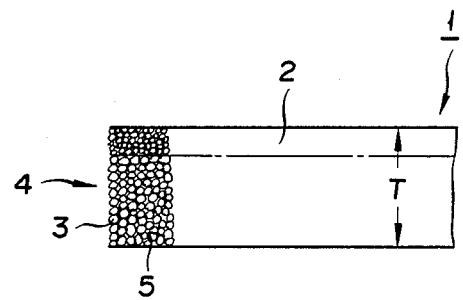
FIG. 1 is a model cross section of a flat permeable membrane embodying this invention.

Now the present invention will be described more specifically below with reference to the accompanying drawings. FIG. 1 is a diagram depicting, as a model, the cross section of a flat permeable membrane according with the present invention. As noted from the diagram, this is a flat polyolefin membrane 1 having a thickness, T, in the range of 10 to 500 μm, preferably 20 to 300 μm. This flat membrane 1 has on one surface side thereof a compact layer 2 formed of intimately bound fine polyolefin particles and possessed of fine pores.

These fine pores have an average diameter in the range of 0.01 to 2 μm, preferably 0.02 to 0.5 μm. This surface is flat and smooth. The flat membrane 1 has in the interior and the other surface thereof a layer 4 of an aggregate of numerous fine discrete polyolefin particles 3 of an average diameter in the range of 0.01 to 5 μm, preferably 0.02 to 1.0 μm, so adjoined as to form fine labyrinthically continuing through pores 5 and establish communication between the opposite surfaces of the membrane. The thickness 7 of the aforementioned compact layer accounts for not more than 30%, preferably for 0.1 to 5%, of the total thickness of the membrane. The compact layer 2, if present at all, is desired to have as small a thickness as possible. In the surface of the membrane opposite the surface constituting the compact layer 2, fine polyolefin particles are intimately bound substantially similarly to the fine particles of the interior and fine pores of a relatively large diameter (such as in the range of 0.1 to 5 μm, preferably 0.1 to 2 μm) as compared with the fine pores in the compact layer 2 are formed.

The porous membrane according with the present invention are particularly useful for the separation of blood components. In this case, the membrane used for this purpose is a porous polyolefin membrane having a thickness in the range of 10 to 500 μm and a porosity in the range of 10 to 85% and possessing through pores of an average diameter in the range of 0.01 to 5 μm, which porous polyolefin membrane is characterized by exhibiting shrinkage of not more than 6.0% after a heat treatment performed at 121° C. for 120 minutes. The term "membrane for separation of blood components" as used herein means a membrane to be used for separating whole blood into blood cells and blood plasma and a membrane to be used for separating the blood plasma into high molecular weight substances and other substances. The porosity of the membrane contemplated by this invention is effective in separating the blood plasma into high molecular weight substances and other substances. The term "high molecular weight substances," though not clearly defined, designates substances of molecular weights larger than the molecular weight of albumin. For example, immune globulin M (IgM; Mw about 950,000), low-density lipoprotein (LDL; Mw about 1,200,000–3,300,000), immune complexes, and rheumatic factors answer the description.

The porous membrane of this invention has a thickness in the range of 10 to 500 μm. If the thickness is less than 10 μm, the membrane suffers from insufficiency of strength and tends to sustain pinholes. If the thickness exceeds 500 μm, the membrane incorporated in a final product gives rise to a module too large to be practical. The thickness of the membrane preferably is in the range of 20 to 300 μm. Further, the porous membrane of the present invention possesses a porosity in the range of 10 to 85%. If the porosity is less than 10%, the membrane fails to acquire sufficient permeability. If the porosity exceeds 85%, the membrane suffers from insufficiency of strength and tends to sustain pinholes. Preferably, the porosity is in the range of 30 to 80%. The method for determination of the porosity and the formula for calculation thereof will be described afterward. The porous membrane of the present invention has through holes of an average diameter in the range of 0.01 to 5 μm. It is because of the presence of these through holes that the membrane is capable of separating blood components. The average pore diameter is variable with the substances contained in the blood components subjected to the separation with the membrane. If the average pore diameter is less than 0.01 μm, the membrane is incapable of passing such useful low molecular weight substances as albumin. If this diameter exceeds 5 μm, the membrane is completely penetrated by blood cells. When the porous membrane is intended for the separation of high molecular weight substances from the blood plasma, the average pore diameter is desired to fall in the range of 0.02 to 2.0 μm.

The porous membrane of the present invention is desired to exhibit shrinkage not exceeding 6.0% after a heat treatment performed at 121° C. for 120 minutes. It is because the porous membrane possesses a construction as described above that this membrane exhibits the outstanding properties as a membrane for the separation of blood components.

The expression "heat treatment performed at 121° C. for 120 minutes" implies the high-pressure steam sterilization specified by the Japanese Pharmacopoeia. The term "shrinkage" as used herein means the extent of change of the porous membrane before and after the aforementioned heat treatment. When the porous membrane is in the form of a flat sheet, the change in the length of the porous membrane in the axial direction of molding and in the length in the direction perpendicular to the axial direction of molding after the aforementioned heat treatment is required to be not more than 6.0%. If the shrinkage exceeds 6.0%, the amount of water allowed to permeate the membrane after the heat treatment is described and, therefore, the membrane provides no sufficient separation of blood components as described more fully afterward. Preferably, the shrinkage is not more than 3.0%.

The porous membrane of the present invention is made of a polyolefin. As the polyolefin, one member or a mixture of two or more members selected from the group consisting of polyethylene, polypropylene, and ethylene-propylene copolymer can be used. Among other polyolefins cited above, polypropylene proves particularly desirable.

Figure 2:
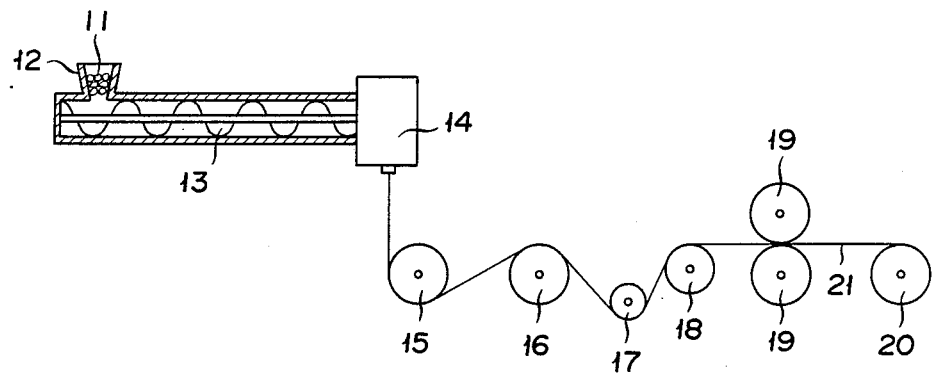
FIG. 2 is a schematic cross section of an apparatus to be used for the manufacture of a flat permeable membrane in accordance with the present invention.

The flat permeable membrane of the foregoing description is prepared as follows, for example. As illustrated in FIG. 2, a mixture 11 comprising a polyolefin, an organic filler, and a crystal seed forming agent is fed via a hopper 12 to a mixer such as, for example, a twin-screw extruder 13, there to be melted, mixed, and extruded. Then, the extruded mixture is forwarded to a T die 14 and discharged therethrough in the form of a flat membrane. Subsequently, the molten membrane is brought into contact with a cooling roll 15 to be cooled and solidified. The membrane, when necessary, is further brought into contact with another cooling roll 16 and feed rolls 17, 18, stretched with drawing rolls 19, 19, and wound up on a takeup roll 20.

After the flat membrane 21 so cooled and solidified is wound up on the takeup roll 20, it is cut into pieces of a prescribed length, then immersed in a liquid extractant to be deprived of the organic filler by extraction, and dried when desired. Consequently, the flat permeable membrane is produced. Further, the flat permeable membrane is subjected to a heat treatment under maintaining a certain or desired area to obtain the flat permeable membrane having good dimensional stability. Furthermore, shape of the side contacting with the roll is depended on the shape of the surface of the roll, so if the surface of the roll is smooth, contact surface of the membrane becomes smooth.

The polyolefin to be used as the raw material in the present invention may be polypropylene or polyethylene, for example. It is desired to be of a grade having a melt index (M.I.) in the range of 5 to 70, preferably 15 to 65. In the polyolefins, polypropylene proves most desirable. In the various grades of polypropylene, those possessing higher degrees of crystallization prove more desirable than those possessing lower degrees of crystallization. The degree of crystallization represents the percentage by weight of the crystallized portion of a given polypropylene based on the total weight of the polypropylene and it is defined by X-ray diffraction, infrared absorption, spectrum, or density. Generally, the vinyl type high polymer $-(CH_2-CHR)_n$ can assume any of the three steric structures, i.e. isotactic and syndiotactic structures which have regularity and an atactic structure which has no regularity, depending on the location of the substituent R. In a given polymer, the ease of crystallization increases in proportion as the proportion of the isotactic or syndiotactic structure increases. This rule also applies to polypropylene. The degree of crystallization of polypropylene proportionately increases with the proportion of the isotactic part of the polymer, namely, the degree of tacticity. In terms of tacticity, a criterion different from the degree of polymerization, the polypropylene to be used in the present invention is desired to have a tacticity of not less than 97%.

The organic filler is required to be uniformly dispersible in the polyolefin in a fused state and, at the same time, easily soluble in the extractant which will be described more fully afterward. Typical examples of the filler of the foregoing description include liquid paraffin (number-averaged molecular weight in the range of 100 to 2,000), α-olefin oligomers such as ethylene oligomer (number-averaged molecular weight in the range of 100 to 2,000), propylene oligomer (number-averaged molecular weight in the range of 100 to 2,000), and ethylene-propylene oligomer (number-averaged molecular weight in the range of 100 to 2,000), paraffin waxes (number-averaged molecular weight in the range of 200 to 2,500), and various hydrocarbons. The liquid paraffin proves particularly desirable.

The amount of the organic filler to be used is desired to fall in the range of 35 to 600 parts by weight, preferably 50 to 300 parts by weight, based on 100 parts by weight of the polyolefin. In the amount of the organic filler is less than 35 parts by weight, the flat porous membrane produced fails to acquire a sufficient permeability to albumin. If this amount exceeds 600 parts by weight, the mixture to be processed into the flat membrane has too low viscosity to be extrusion molded in the form of a membrane. The raw material is prepared (designed) by the premixing method which comprises melting and mixing the components weighed out in prescribed proportions by the use of a twin-screw type extruder, for example, extruding the resultant molten mixture, and pelletizing the extruded mixture.

The crystal seed forming agent to be incorporated in the raw material in the present invention is an organic heat-resisting substance which has a melting point required to exceed 150° C. and desired to fall in the range of 200° to 250° C. and a gel point exceeding the temperature at which the polyolefin to be used begins to crystallize. The incorporation of the crystal seed forming agent in the raw material is aimed at decreasing the polyolefin particles in diameter and controlling the diameter of the pores to be formed by the organic filler incorporated in the raw material and subsequently removed therefrom by extraction. Typical examples of the crystal seed forming agent are 1,3,2,4-dibenzylidene sorbitol, 1,3,2,4-bis(p-methylbenzylidene)-sorbitol, 1,3,2,4-(p-ethylbenzylidene)-sorbitol, bis(4-t-butylphenyl)-sodium phosphate, sodium benzoate, adipic acid, talc, and kaolin.

Generally, the crystal seed forming agent is used for improving the transparency of the resin to be formed.

In the present invention, owing to the use of the crystal seed forming agent, the polyolefin particles can be shrunken to an extent that the diameter of the pores formed in the membrane will not be controlled by the diameter of the polyolefin particles and, as a result, the voids to be formed subsequently by the removal of the organic filler by extraction can be controlled to a diameter conforming with the objects of the membrane. The amount of the crystal seed forming agent to be incorporated in the raw material is required to fall in the range of 0.1 to 5 parts by weight, preferably 0.3 to 1.0 part by weight, based on 100 parts by weight of the polyolefin.

The mixture of raw materials prepared as described above is melted and mixed as with a twin-screw extruder at a temperature in the range of 160° to 250° C., preferably 180° to 230° C. and discharged in the form of a flat membrane through a T die. The molten membrane so emanating from the T die is allowed to fall into contact with a cooling roll to be cooled and solidified. The cooling roll is kept at a prescribed temperature by circulation therethrough of cold water or some other suitable cooling medium. At this time, the cooling temperature (the temperature of the cooling roll) is in the range of 10° to 100° C., preferably 30° to 80° C. If this temperature is less than 10° C., the cooling speed is so high that the phase separation does not proceed sufficiently and the permeability of the membrane to albumin is insufficient. If the temperature exceeds 100° C., the polyolefin crystallizes so slowly as to accelerate fusion and association of adjacent fine particles, decrease the porosity of the membrane, and increase the diameter of fine through pores, with the result that the membrane acquires a texture incapable of removing pathogenic macromolecules and liable to be clogged.

The extractant to be used in this invention can be any of the substances capable of dissolving and extracting the organic filler without dissolving the polyolefin forming the membrane. Typical examples of the extractant are alcohols such as methanol, ethanol, propanols, butanols, hexanols, octanols, and lauryl alcohol, and halogenated hydrocarbons such as 1,1,2-trichloro-1,2,2-trifluoroethane, trichlorofluoromethane, dichlorofluromethane, and 1,1,2,2-tetrachloro-1,2-difluoroethane. In the extractants cited above, halogenated hydrocarbons prove desirable in terms of ability to extract the organic filler. From the standpoint of safety on the part of the human system, chlorofluorinated hydrocarbons prove particularly desirable.

The porous membrane obtained as described above is subjected to a heat treatment for further stabilization of the texture and permeability thereof. This heat treatment is carried out in an atmosphere of such gas as air, nitrogen, or carbon dioxide at a temperature 20° to 50° C. lower than the melting point of the polyolefin for a period in the range of 1 to 120 minutes, preferably 2 to 60 minutes. To undergo this heat treatment effectively, the porous membrane is required to be maintained in a certain or desired area during the heat treatment. In order to maintain the certain area, the flat membrane may be cut into pieces of a prescribed length in advance of the heat treatment. Although the heat treatment can be made even before the extraction of the organic filler so long as the membrane of polyolefin has been cooled and solidified.

For the present invention, it is essential that the membrane should be kept from exposure to any extraneous force such as elongation throughout the entire course of manufacture described above. If the external force such as elongation is suffered to confer persistent stress upon the web of the membrane, the intense heat applied during the sterilization in an autoclave seriously affects the texture and permeability of the membrane because of thermal shrinkage. It is, therefore, imperative that the membrane should be kept from exposure to tension by all means even when the membrane already cooled and solidified is wound up on the takeup roll, for example.

Figure 3:
FIGS. 3 through 17 are electron photomicrographs showing textures of flat permeable membranes according with the present invention.
Figure 4:
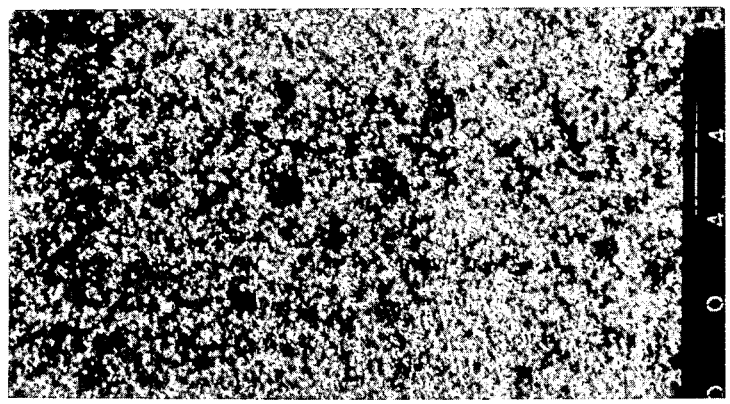
Figure 5:
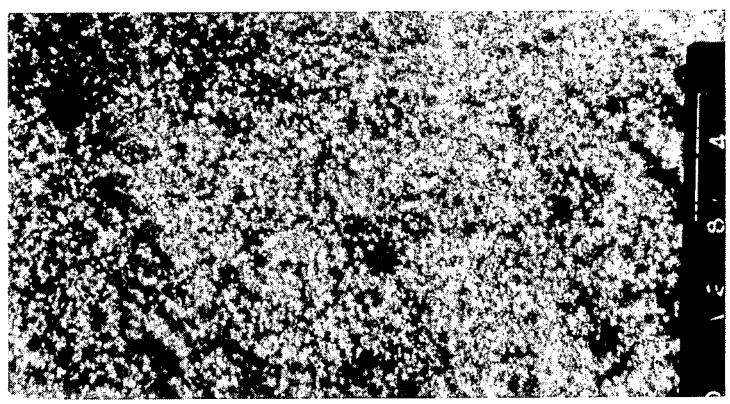
Figure 6:
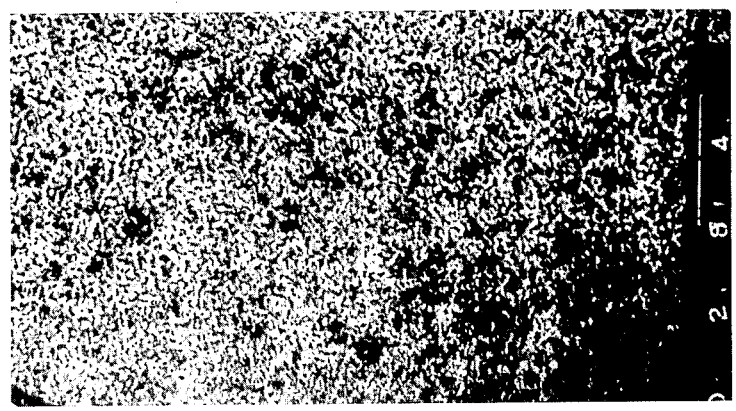
Figure 7:
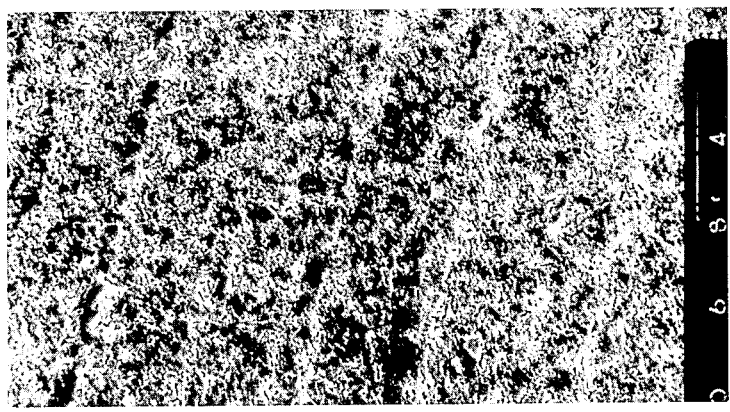
Figure 8:
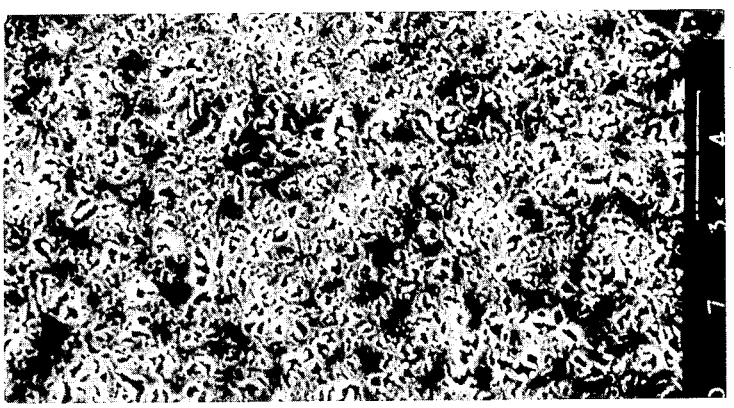
Figure 9:
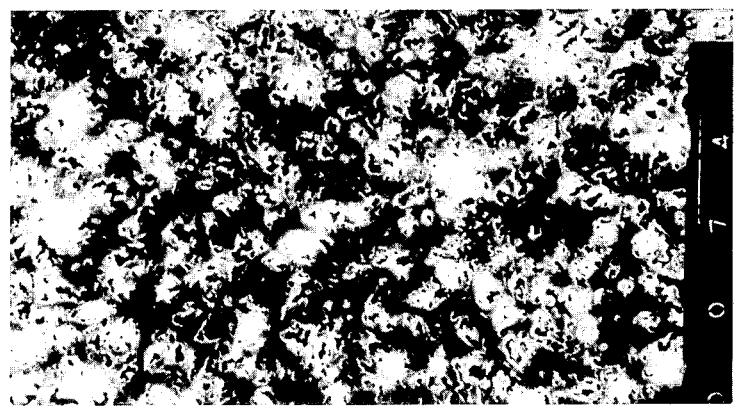
Figure 10:
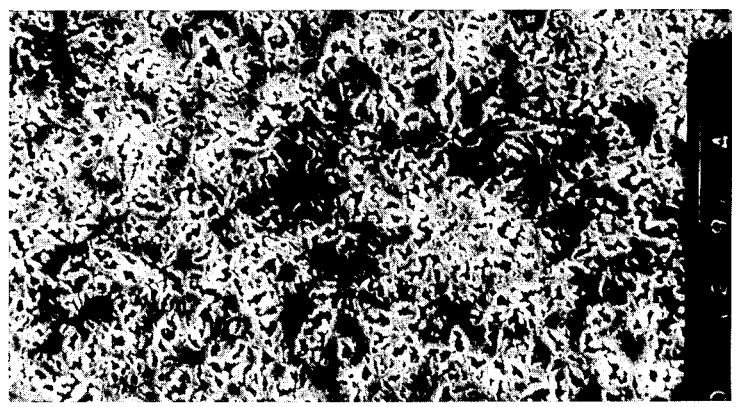
Figure 11:
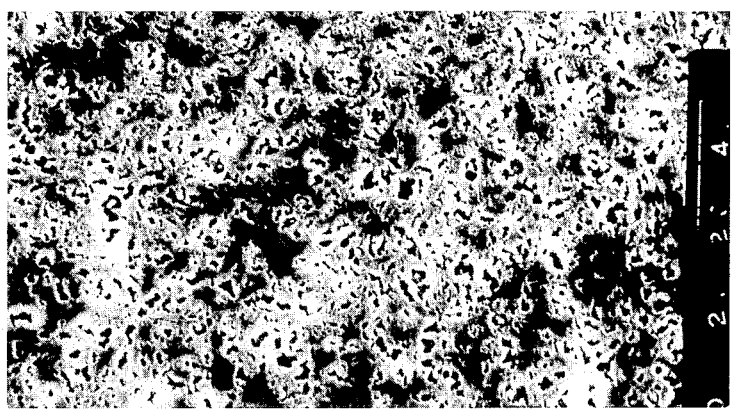
Figure 12:
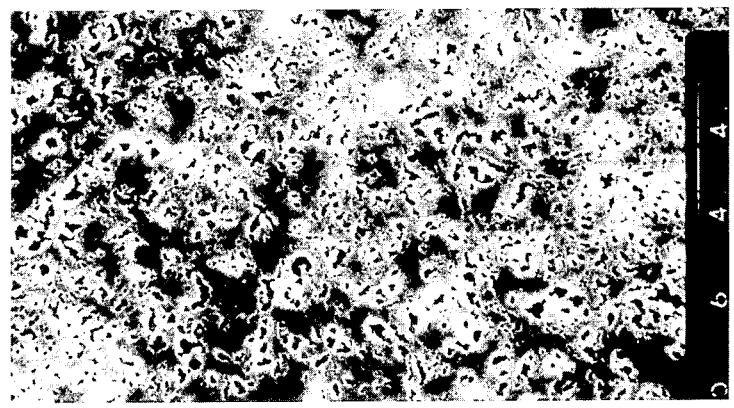
Figure 13:
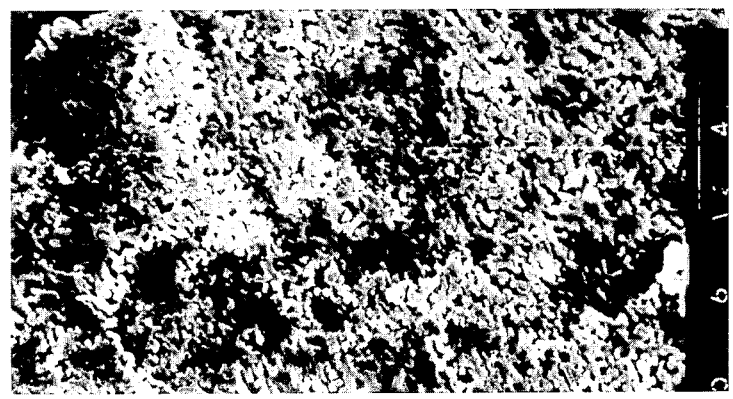
Figure 14:
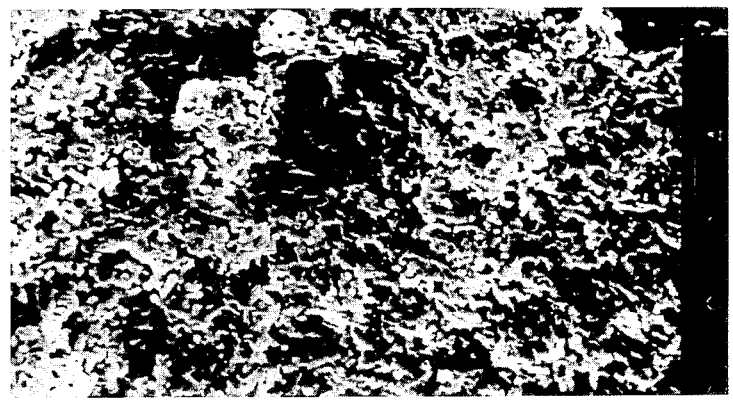
Figure 15:
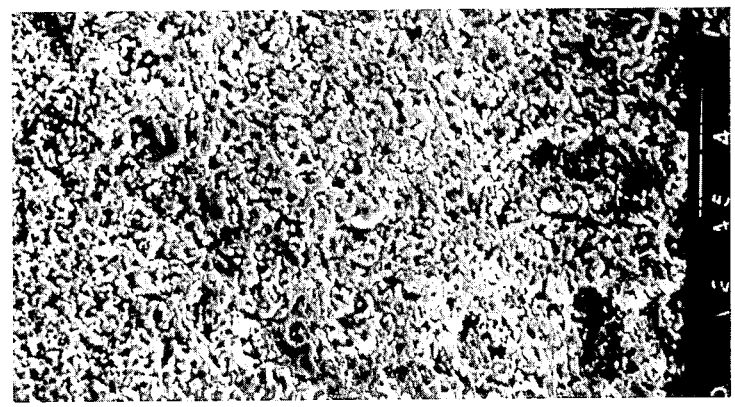
Figure 16:
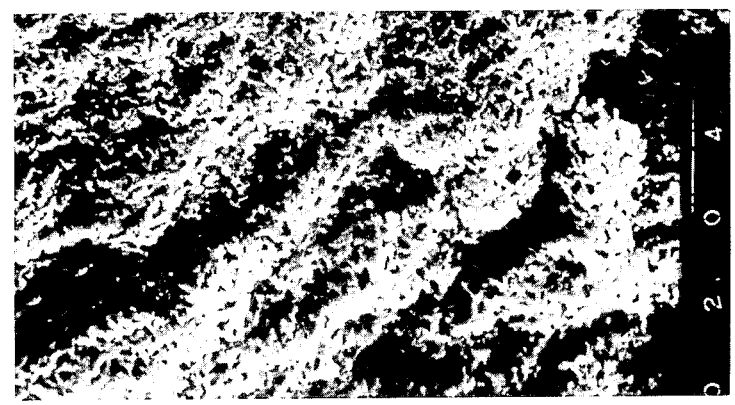
Figure 17:
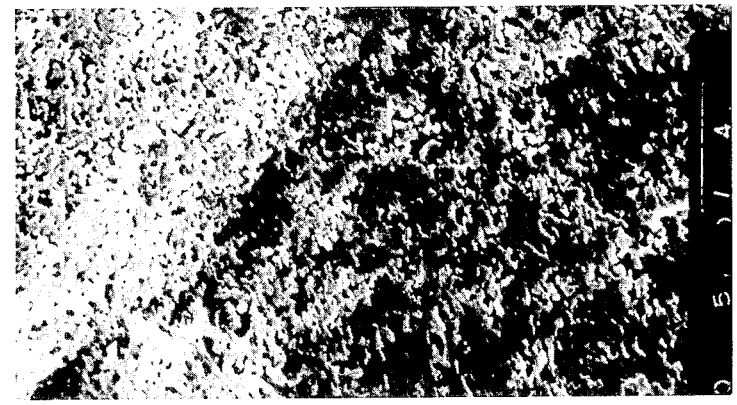
Figure 20:
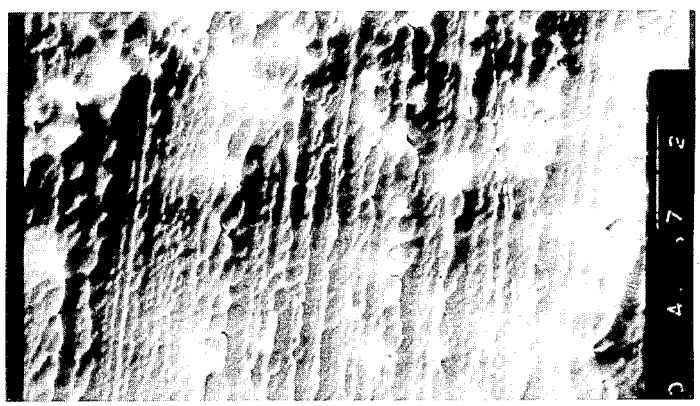
FIGS. 20 through 22 are electron photomicrographs showing textures of flat permeable membranes not incorporating a blood plasma seed forming agent.
Figure 21:
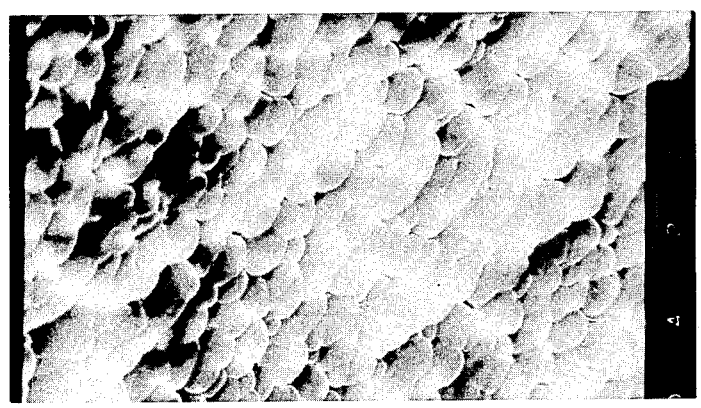
Figure 22:
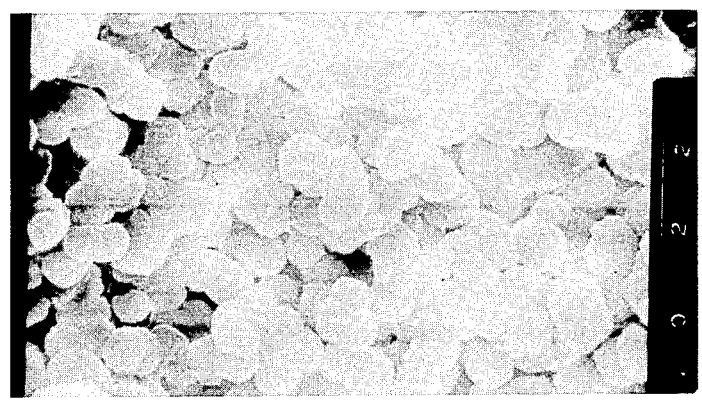

The flat permeable membrane obtained as described above is a sheet of a thickness in the range of 10 to 500 µm, preferably 20 to 300 µm. As noted clearly from FIG. 3 (roll temperature 12° C.), FIG. 4 (roll temperature 30° C.), FIG. 5 (roll temperature 40° C.), FIG. 6 (roll temperature 50° C.), and FIG. 7 (roll temperature 60° C.) which are photographs taken through a scanning electron microscope at 3,000 magnifications (applicable hereinafter), the membrane assumes a texture which has in the surface of the side exposed to the roll a compact layer formed of intimately bound fine polyolefin particles and possessed of fine pores. In the surface of the side exposed to the air opposite the roll, the texture has a layer formed of intimately bound fine polyolefin particles and possessed of fine pores of a relatively large diameter compared with the pores in the aforementioned compact layer as clearly noted from FIG. 8 (roll temperature 12° C.), FIG. 9 (roll temperature 30° C.), FIG. 10 (roll temperature 40° C.), FIG. 11 (roll temperature 50° C.), and FIG. 12 (roll temperature 60° C.). In the interior, the texture has a layer formed of an aggregate of relatively large discrete polyolefin particles so adjoined that their interstices form labyrinthically continuing through pores as clearly noted from FIG. 13 (roll temperature 12° C.), FIG. 14 (roll temperature 30° C.), FIG. 15 (roll temperature 40° C.), FIG. 16 (roll temperature 50° C.), and FIG. 17 (roll temperature 60° C.). In the case of the membrane produced without incorporation of the crystal seed forming agent, the surface of the texture exposed to the roll (roll temperature 50° C.) is as shown in FIG. 20 and the cross section of the texture in FIG. 21, and the surface exposed to the air in FIG. 22 respectively.

It is believed that the membrane produced by the method of this invention acquires such an anisotropic texture as described above possibly for the following reason.

The polyolefin admixed with the organic filler and the crystal seed forming agent is extruded in the form of a sheet and the extruded sheet is brought into contact with the cooling roll. Thus, the solidification of the extruded sheet of polyolefin begins in the surface of the sheet exposed to the roll. Since the cooling of the interior and the surface not exposed to the roll is retarded as compared with the surface exposed to the roll, phase separation between the polyolefin and the organic filler in the membrane proceeds in proportion to the delay in the cooling, with the result that the organic filler which has been dispersed is agglomerated to some extent. It is surmised that, as the result of this peculiar phenomenon, the permeable membrane of the present invention acquires a special texture containing small pores in the surface exposed to the roll and large pores in the interior and the surface not exposed to the roll. Further, in the surface of the membrane exposed to the roll, the force generated in consequence of the contact of the membrane with the roll crushes the polyolefin particles and adds to the conspicuousness of difference in texture between the surface exposed to the roll and the other parts of the membrane.

Since the solidification of the extruded sheet of polyolefin begins in the surface of the sheet exposed to the roll as described above, the delay in this solidification increases in proportion as the distance from the surface exposed to the roll increases. This is why the pores are larger in diameter in the surface of the membrane not exposed to the roll than the pores in the interior of the membrane. Probably because of the mechanism described above, the pores in the permeable membrane of this invention gradually increase in diameter from the surface exposed to the roll toward the surface not exposed to the roll.

As noted from the diagram, the porosity and the diameter of pores are both decreased and the pores assume a circular cross section in the surface exposed to the roll when the temperature of the cooling roll is low (enough to effect sudden cooling). When the temperature of the roll is elevated to 50° to 60° C., the porosity is improved and the pores are enabled to communicate with one another. To be specific, when the cooling speed is heightened, the liquid paraffin assumes a dispersed phase in the surface texture of the membrane. This dispersed phase of liquid paraffin can be approximated to a continuous phase by lowering the cooling speed. When the cooling speed is excessively lowered, however, the phase separation is accelerated and the association of adjacent polyolefin particles is promoted and, as the result, the number of pores is conversely decreased. Since the liquid paraffin phase is destined to form fine pores after extraction thereof, the liquid paraffin is desired to be in a continuous phase. From the standpoint of strength, the polyolefin which constitutes itself the matrix of the membrane is desired to be similarly in a continuous phase. It is important that the membrane should be formed under conditions which permit the polyolefin and the liquid paraffin to be separated from each other, each forming a continuous phase. These conditions are attained in the aforementioned range of temperature.

The permeable membrane so produced has a porosity in the range of 10 to 85%, preferably 30 to 60%.

Figure 18:
FIGS. 18 and 19 are electron photomicrographs showing textures of commercially available porous membranes.
Figure 19:
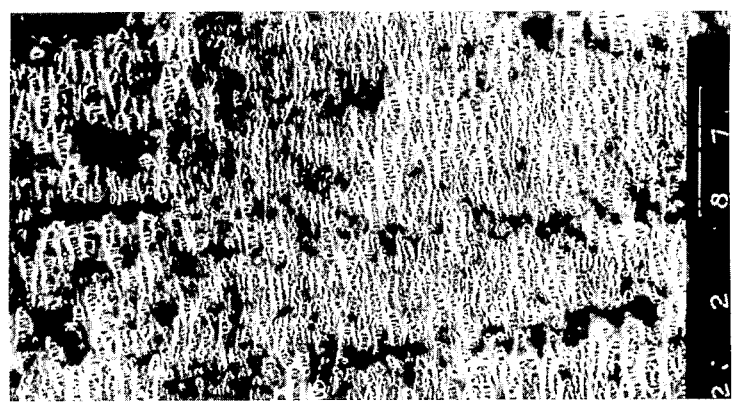

The conventional flat polyolefin membrane produced by the stretching method is devoid of particles as clearly noted from the cross section thereof illustrated in FIG. 18 and the surface illustrated in FIG. 19. It is instead allowed to form fine pores with cracks which occur when the membrane is stretched.

In the present invention, the side of the permeable membrane exposed to the roll is enabled to acquire a flat smooth surface so long as the roll to be used has a flat smooth surface. When the blood plasma is passed on the flat smooth surface of the membrane, it forms a uniform flow free from turbulence because the surface has no irregularities. The flat smooth surface does not easily cause clogging. It also proves advantageous in fractionating property and treating capacity.

The term "porosity" as used in the specification is defined and the method for its determination is indicated below. The definition of the term "average particle diameter" and the method for its determination are both indicated below.

1. Method for determination and definition of porosity

A given sample of flat membrane is immersed in ethanol. Then the ethanol is displaced with water to impregnate the membrane with water. The impregnated membrane is weighed (Wwet). Let Wdry stand for the weight of the membrane in its dry state and $\rho$ for the density of polymer in g/ml, and the porosity will be calculated by the following formula.

$$\text{Porosity} = \frac{\text{Volume of pores}}{\text{Volume of polymer portion}} \times 100(\%)$$

$$= \frac{(W\text{wet} - W\text{dry})}{(W\text{dry}/\rho) + (W\text{wet} - W\text{dry})} \times 100(\%)$$

2. Method for determination of average particle diameter

With the aid of a scanning electron microscope (Model JSM-50A or JSM-840, made by Japan Electron Optics Laboratory Co., Ltd.), 50 fine particles of a given sample viewed at 10,000 or 3,000 magnifications are measured in diameter and the 50 numerical values so found are averaged.

3. Method for determination of average pore diameter

With the aid of the scanning electron microscope, 100 pores of a given sample viewed at 10,000 (or 20,000) magnifications are measured in diameter and the 100 numerical values so found are averaged.

Now, the present invention will be described more specifically below with reference to working examples.

EXAMPLES 1-3

In a twin-screw extruder (produced by Ikegai Iron Works, Ltd. and marketed under trademark designation of "PCM-30-25"), 100 parts by weight of polypropylene having a M.I. of 23, 100 parts by weight of liquid paraffin (number average molecular weight 324), and a varying amount, indicated in Table 1, of 1,3,2,4-dibenzylidene sorbitol (produced by E.C. Co. and marketed under trademark designation of "EC-1") or 1,3,2,4-bis(p-methylbenzylidene)-sorbitol (product by Shin-Nippon Rika K.K. and marketed under trademark designation of "Gelol MD") as a crystal seed forming agent were melted and mixed and extruded.

The extruded mixture was then pelletized. In an apparatus constructed as illustrated in FIG. 2, the pellets were melted with a twin-screw extruder (produced by Ikegai Iron Works, Ltd. and marketed under trademark designation of "PCM-30-25") at 150° to 200° C. and the molten mixture was discharged through a T die 14 having a width of 0.6 mm into the ambient air at a rate of 70 g/min. The discharged molten mixture was allowed to fall into contact with the water on the surface of a cooling roll 15 disposed below the T die 14 to be cooled and solidified. The solidified web was stretched with a stretching rolls 19 and 19 and then wound up on a takeup roll 20. The sheet so wound up on the takeup roll 20 was cut into pieces of a prescribed length and immersed twice in 1,1,2-trichloro-1,2,2-trifluoroethane (hereinafter referred to as "Freon 113") at 25° C. for 10 minutes to effect extraction of a fixed duration. The sheet was then heated in air at 130° C. for two minutes and treated with an aqueous 50% ethanol solution to be rendered hydrophilic. Consequently, there was obtained a flat permeable membrane exhibiting properties as shown in Table 1.

CONTROLS 1 AND 2

Commercially available flat permeable polypropylene membrane and flat permeable polytetrafluoroethylene membrane both produced by the stretching method were subjected to the same test as in Example 1. The results are shown in Table 1.

TABLE 1

| Example | Crystal seed forming agent Type | Crystal seed forming agent Amount (phr) | Roll Temperature(°C.) | Blue dextran test Permeability (%) | Blue dextran test Flux (ml/hr) (A) | Water flux (ml/min.mmHg. m²) (B) | Porosity (%) | Thickness of membrane (μm) | Blue dextran flux Water flux (A/B) |
|---|---|---|---|---|---|---|---|---|---|
| 1 | EC-1 | 0.5 | 50 | 0 | 11.9 | 1.2 | 36 | 130 | 9.9 |
| 2 | EC-1 | 1.0 | 50 | 0 | 10.1 | 0.9 | 37 | 130 | 12.1 |
| 3 | Gelol MD | 0.3 | 50 | 0 | 11.6 | 1.3 | 37 | 130 | 8.9 |
| Control 1 | — | — | — | 0 | 9.4 | 5.0 | 40 | 30 | 1.9 |
| Control 2 | — | — | — | 0 | 3.3 | 0.46 | 20 | 80 | 7.2 |

The blue dextran test mentioned in Table 1 was carried out as follows. An aqueous solution of 0.05% by weight of Blue Dextran 200 (product of Farmarcia Corp, having weight average molecular weight of 2,000,000) was caused to penetrate a given sample under pressure of 0.3 kg/cm² to determine permeability of the sample and the amount of the aqueous solution (flux) passed through the sample during the first one hour. The porosity, P, was calculated in accordance with the following formula.

$$P = \frac{W - D}{D/0.94 + (W - D)} \times 100(\%)$$

(wherein W stands for weight fo water contained and D for absolute dry weight).

The amount of water passed was determined by causing water to penetrate through a sample membrane 1.38×10⁻³ m² in area under pressure of 150 mmHg, clocking the time required for a fixed volume (5 ml) of water to pass through the sample, and reporting the time.

The secondary filter to be used in the plasma separator is desired to exhibit permeability as close to 0 as possible in the blue dextran test and to possess as high a flux as possible. The ratio of blue dextran flux/water flux increases with the decreasing extent of clogging caused in the membrane by the solute. Thus, the ratio is desired to be as high as possible.

The performance of the membrane is rated in terms of the factors coupled with the results of rating with bovine blood plasma which will be described fully afterward. Modules of a membrane area of 100 cm² (5×20 cm) were prepared by using permeable membranes obtained in Examples 1 and 3 and Controls 1 and 2. A given module was immersed in a constant temperature bath kept at 37° C. The bovine blood plasma (containing 5.1 g of albumin and 9.4 g of total protein per liter) obtained with the first filter of a plasma separator made by Terumo Co., Ltd. was fed through an air chamber to the module with a pump I at a rate of 0.2 ml/min. (blood plasma flow rate 280 cm/min), with the filtrate circulated at a rate of 70 ml/min. to the air chamber with a pump II. The residue of filtration was assayed by HPLC (column TSK-G3000SW, flow rate 1 ml/min, solvent 0.3M-Nacl-containing 0.1M Sören Buffer (pH 7.0), detection 280 nm O.D.). The results were shown in Table 2.

TABLE 2

| Permeable membrane | $\Delta p^{(1)}$ (mmHg) | Recovery ratio (%)$^{(2)}$ | | | A/M enhancement (%)$^{(3)}$ |
|---|---|---|---|---|---|
| | | Albumin | Globulin | Macromolecule | |
| Example 1 | 21 | 84.9 | 64.7 | 16.1 | 427 |
| Example 3 | 43 | 80.4 | 60.6 | 13.1 | 514 |
| Control 1 | 89 | 74.9 | 60.3 | 19.4 | 287 |
| Control 2 | 102 | 38.0 | 26.7 | 10.2 | 372 |

$^{(1)}\Delta P = P_{Qf} = 50 - P_{Qf} = 10$
$^{(2)}$Average of the values up to Qf = 50 (ml).
$^{(3)}$[(A/M of filtrate)/(A/M of blood plasma)-1] × 100 (%).

EXAMPLES 4–8

Flat permeable membranes were obtained by following the procedure of Example 1 by using 100 parts by weight of polypropylene having a M.I. of 30, 100 parts, 150 parts, and 174 parts respectively by weight of liquid paraffin (number average molecular weight of 324), and 0.5 parts by weight of EC-1. They were tested by following the procedure of Example 1. The results were shown in Table 3.

The membranes of Examples 4–8 and Controls 1 and 2 were tested with bovine blood plasma by following the procedure of Example 1. The results were shown in Table 4.

mixed, and extruded. The extruded mixture was pelletized. The pellets were melted in the same extruder at 150° to 200° C. and the molten mixture was extruded through a T die having a slit with of 0.6 mm at a rate of 100 g/min into the ambient air. The extruded molten mixture was allowed to fall into contact with a cooling roll having a surface temperature of 35° C. to be cooled and solidified. The cooled sheet was wound up on a takeup roll. The sheet so wound up was cut into pieces of a prescribed length. A membrane so obtained was fixed in the longitudinal and lateral directions, immersed twice in 1,1,2-trichloro-1,2,2-trifluoroethane at 25° C. for 10 minutes to effect extraction of liquid paraffin, and then heated in air at 135° C. for two minutes.

The membrane so produced was tested for the properties described above. The results are shown in Table 1. The sample of membrane used for evaluation of permeability was treated with an aqueous 50% ethanol solution to be rendered hydrophilic and then washed with water before use.

EXAMPLE 10

A porous membrane was obtained by following the procedure of Example 9, except that the amount of liquid paraffin was changed to 170 parts by weight. The properties of the membrane consequently produced are shown in Table 5.

TABLE 3

| Example | Liquid paraffin content (parts by weight) | Roll temperature (°C.) | Membrane thickness (μm) | Blue dextran test | | Water flux (ml/min · mmHg · m$^2$) | Porosity (%) | (A/B) |
|---|---|---|---|---|---|---|---|---|
| | | | | Permeability (%) | Flux (ml/hr) (A) | | | |
| 4 | 100 | 50 | 165 | 0 | 9.1 | 1.70 | 38.8 | 5.4 |
| 5 | 100 | 60 | 165 | 0 | 9.3 | 1.80 | 39.0 | 5.2 |
| 6 | 100 | 70 | 165 | 0 | 10.5 | 2.10 | 40.1 | 5.0 |
| 7 | 150 | 45 | 45 | 0.2 | 11.0 | 6.81 | 39.5 | 1.6 |
| 8 | 174 | 40 | 45 | 0 | 12.3 | 6.51 | 43.8 | 1.9 |

TABLE 4

| Permeable membrane | Δp (mmHg) | Recovery ratio (%) | | | Enhancement (%) | | Permeability (%) | | |
|---|---|---|---|---|---|---|---|---|---|
| | | Albumin | Globulin | Macromolecule | A/G | A/M | Albumin | Globulin | Macromolecule |
| Control 1 | 89 | 74.9 | 60.3 | 19.4 | 24.1 | 287 | 65.5 | 48.5 | 12.8 |
| Control 2 | 102 | 38.0 | 26.7 | 10.2 | 42.3 | 372 | 30.4 | 19.7 | 6.8 |
| Example 4 | 47 | 79.4 | 51.8 | 7.7 | 53.2 | 931 | 74.0 | 41.4 | 5.1 |
| Example 5 | 18 | 88.8 | 70.6 | 20.3 | 25.9 | 341 | 85.1 | 58.6 | 12.9 |
| Example 6 | 14 | 88.7 | 64.6 | 17.9 | 37.4 | 397 | 85.2 | 54.4 | 12.2 |
| Example 7 | 9 | 90.6 | 68.4 | 14.2 | 32.5 | 538 | 88.3 | 57.4 | 10.2 |
| Example 8 | 9 | 91.6 | 66.8 | 14.0 | 37.1 | 554 | 89.0 | 57.4 | 9.8 |

EXAMPLE 9

In a twin-screw extruder (produced by Ikegai Iron Works, Ltd. and marketed under trademark designation of "PCM-30"), 100 parts by weight of polypropylene having a M.I. of 30, 130 parts by weight of liquid paraffin (number average molecular weight of 324), and 0.3 part by weight of 1,3,2,4-bis(para-ethylbenzylidene)-sorbitol as a crystal seed forming agent were melted,

CONTROL 3

A porous membrane was obtained by following the procedure of Example 10, except that the fixing of the sheet into pieces of a prescribed length and the heat treatment were omitted. The properties of the membrane consequently obtained are shown in Table 5.

CONTROL 4

A commercially available permeable polypropylene membrane produced by the stretching method (produced by Polyplastic Co., Ltd. and marketed under trademark designation of "Dulagart 2500") was tested for properties by following the procedure of Example 9. The results are shown in Table 5.

EXAMPLE 11

A porous membrane was obtained by following the procedure of Example 9, except that the temperature of the heat treatment was changed to 117° C. The membrane consequently obtained was tested for properties. The results are shown in Table 5.

EXAMPLE 12

A porous membrane was obtained by following the procedure of Example 10, except that the temperature of the heat treatment was changed to 120° C. The properties of the membrane consequently obtained are shown in Table 5.

CONTROL 5

A porous membrane was obtained by following the procedure of Example 9, except that the temperature of the heat treatment was changed to 100° C. The properties of the membrane consequently produced are shown in Table 5.

heated therein at 121° C. for 120 minutes. The length of the membrane after this heat treatment was compared with the length before the heat treatment fo find the decrease in percentage. This shrinkage was reported.

(2) Thickness of membrane:

This dimension was actually measured by the use of a micrometer.

(3) Porosity (P):

A given flat porous membrane was immersed in ethanol and treated with water for displacement of ethanol with water. The membrane so impregnated with water was weighed ($W_w$). The membrane, in a dry state, was weighed ($W_D$). The porosity (P) was calculated by the following formula:

$$P = \frac{W_w - W_D}{(W_D/\rho) + (W_w - W_D)} \times 100(\%)$$

wherein $\rho$ stands for the density of the polymer in g/ml.

(4) Average pore diameter (d):

A given sample was photographed through a scanning electron microscope (produced by Japan Electron Optics Laboratory Co., Ltd. and marketed under trademark designation of "JSM-50A" or "JSM-840") at 10,000 magnifications and 100 pores found in the photograph were measured for major diameter ($d_A$) and minor diameter ($d_B$) to calculate their average as follows.

TABLE 5

| | Shrinkage of membrane before and after autoclave sterilization (121° C., 120 minutes) | | Change in porosity | | Change in average pore diameter | | Water flux (ml/hr.mmHg.m²) | |
|---|---|---|---|---|---|---|---|---|
| | Axial direction of forming | Perpendicular to axial direction of forming | Before autoclave sterilization (%) | After autoclave sterilization (%) | Before autoclave sterilization (%) | After autoclave sterilization (%) | Before autoclave sterilization | After autoclave sterilization |
| Example 9 | 0 | 0 | 40.6 | 40.1 | 0.20 | 0.20 | 330 | 333 |
| Example 10 | 0 | 0 | 42.1 | 41.9 | 0.25 | 0.25 | 610 | 607 |
| Control 3 | 14.1 | 14.1 | 42.5 | 21.4 | 0.25 | 0.20 | 610 | 205 |
| Control 4 | 19.9 | 7.1 | 46.3 | 36.5 | 0.22 | 0.26 | 360 | 430 |
| Example 11 | 5.6 | 2.3 | 40.3 | 39.5 | 0.19 | 0.18 | 335 | 329 |
| Example 12 | 2.7 | 2.6 | 43.3 | 42.8 | 0.26 | 0.25 | 618 | 610 |
| Control 5 | 10.4 | 5.4 | 40.5 | 30.8 | 0.20 | 0.16 | 328 | 159 |

It is noted from the foregoing results that the porous membranes according with this invention thermally stable to defy dimensional change by the heat of autoclave sterilization and avoid change in porosity, average pore diameter, and amount of water passed, whereas the membranes of controls were notably shrunken after autoclave sterilization so that, when incorporated in products, they had the possibility of sustaining rupture of sealed parts and entailing other drawbacks after the autoclave sterilization. These membranes were also degraded seriously in other properties. Probably because the porous membranes produced by the stretching method sustained persistent inner stress due to the external force of stretching applied during the molding and the stress remained after the molding, the porous membranes yielded to dimensional change on exposure to heat.

The physical properties involved in Example 8 and the following examples were determined as follows.

(1) Thermal shrinkage:

A disc of a given membrane 156 mm in diameter was immersed in ethanol and then treated with water for displacement of the ethanol with water. The disc impregnated with water was placed in an autoclave and $$d = \frac{\sum_{i=1}^{100} d(i)}{100} \quad \left( di = \frac{d_A + d_B}{2} \right)$$

(5) Water flux:

Through a given membrane having an area of $1.38 \times 10^{-3}$ m², water was caused to pass under pressure of 150 mmHg at 25° C. The time for 5 ml of water to pass through the membrane was clocked.

As described above, this invention is directed to a flat permeable polyolefin membrane 10 to 500 μm in thickness, which has in one surface thereof a compact layer formed of intimately bound fine polyolefin particles and possesed of fine pores and in the interior and the other surface thereof a layer formed of an aggregate of fine discrete polyolefin particles of an average diameter in the range of 0.01 to 5 μm so adjoined as to form fine labyrinthically continuing through pores and which, therefore, establishes communication between the opposite surfaces of the membranes. The aforementioned fine through pores are not linearly passed through the membrane in the direction of thickness of the membrane but are formed between the aforementioned fine particles as directed from the surface through the interior to the other surface of the membrane as interconnected to one another. Further, the pores outside the compact layer are larger in diameter than the pores inside the compact layer. When the permeable membrane is used for the separation of blood plasma, therefore, it permits efficient removal of pathogenic macromolecules without entailing clogging or pressure loss and provides recovery of albumin at a high ratio and fulfils its function stably for a long time. The membrane, therefore, proves highly useful for the separation of blood plasma, especially as a secondary filter for the separation of blood plasma.

This invention is also directed to a method for the manufacture of a flat permeable membrane, characterized by the steps of mixing a polyolefin, an organic filler uniformly dispersible in the polyolefin in the molten state thereof and easily soluble in an extractant to be used, and a crystal seed forming agent, discharging the resultant mixture in the molten state thereof through a die, bringing one surface of the discharged molten membrane into contact with a cooling roll thereby cooling and solidifying the membrane, and placing the cooled and solidified flat membrane into contact with an extractant incapable of dissolving the polyolefin thereby extracting and removing the organic filler from the web of the membrane. While the mixture prepared by uniform dispersion in a molten state is cooled and solidified, the polyolefin and the organic filler in the mixture undergo phase separation and the organic filler is extracted from the mixture to give rise to fine pores in the interstices of the fine polyolefin particles. Further, the inclusion of the crystal seed forming agent promotes size reduction of the particles of polyolefin. Thus, the diameter of the fine pores can be regulated as desired. Moreover, the phase separation can be regulated in the direction of the thickness of the membrane by suitably selecting the amount of the organic filler to be incorporated, the amount of the crystal seed forming agent to be incorporated, and the cooling temperature, for example.

While stretching method is incapable of producing a membrane in a thickness exceeding about 40 μm, this invention is capable of producing a membrane in a greater thickness. The membrane produced in accordance with its invention, therefore, enjoys improvement in strength and permits effective use in a greater surface area. It proves useful as a filter for separation and as a substrate for coating.

What is claimed is:

1. A flat permeable polyolefin membrane comprising a polyolefin containing a crystal seed forming agent, said membrane having a thickness of 10 to 500 μm and having in one surface thereof as a filtering surface a compact layer formed of intimately bound fine polyolefin particles and possessed of fine pores and in the interior and the other surface thereof a layer formed of an aggregate of fine discrete polyolefin particles of an average diameter in the range of 0.01 to 5 μm so adjoined as to form fine labyrinthically continuing through pores and which, therefore, established communication between the opposite surfaces of said membrane, said membrane having a shrinkage of not more than 6.0% after a heat treatment performed at 121° C. for 120 minutes.

2. A flat permeable polyolefin membrane according to claim 1, wherein the compact layer accounts for not more than 30% of the total thickness of the membrane.

3. A flat permeable polyolefin membrane according to claim 1, wherein the polyolefin membrane has a porosity in the range of 10 to 85%.

4. A flat permeable polyolefin membrane according to claim 3, wherein the porosity is in the range of 10 to 60%.

5. A flat permeable polyolefin membrane according to claim 1, wherein the fine pores of the compact layer have an average diameter in the range of 0.01 to 5 μm.

6. A flat permeable polyolefin membrane according to claim 1 wherein the fine particles of the layer formed of the aggregate of fine discrete particles have an average diameter in the range of 0.02 to 1.0 μm.

7. A flat permeable polyolefin membrane according to claim 1 wherein the polyolefin is at least one member selected from the group consisting of polyethylene, polypropylene, and ethylene-propylene copolymer.

8. A flat permeable polyolefin membrane according to claim 1 wherein the surface constituting the compact layer is flat and smooth.

9. A flat permeable polyolefin membrane according to claim 1 wherein the porosity is in the range of 10 to 60%.

10. A flat permeable polyolefin membrane according to claim 9 wherein the thickness of the membrane is in the range of 20 to 300 μm.

11. A flat permeable polyolefin membrane according to claim 1 which is suitable for use in the separation of blood components.

12. A flat permeable polyolefin membrane according to claim 11, wherein the average diameter of the fine pores is in the range of 0.02 to 2.0 μm.

13. A flat permeable polyolefin membrane according to claim 10, wherein the porosity is in the range of 30 to 80%.

14. A flat permeable polyolefin membrane according to claim 1, wherein the shrinkage is not more than 3.0%.

15. A flat permeable polyolefin membrane according to claim 1, wherein the crystal seed forming agent is incorporated in an amount of 0.1 to 5 parts by weight based on 100 parts by weight of said polyolefin.

* * * * *

UNITED STATES PATENT AND TRADEMARK OFFICE
CERTIFICATE OF CORRECTION

PATENT NO. : 4,743,375

DATED : May 10, 1988

INVENTOR(S) : Seita et al.

It is certified that error appears in the above-identified patent and that said Letters Patent is hereby corrected as shown below:

Col. 1, line 54, change "hyman" to --human--.

Col. 12, line 49, change "fo" to --for--.

Signed and Sealed this

Fifth Day of December, 1989

*Attest:*

JEFFREY M. SAMUELS

*Attesting Officer*     *Acting Commissioner of Patents and Trademarks*